United States Patent [19]
Ishii

[11] Patent Number: 5,940,168
[45] Date of Patent: Aug. 17, 1999

[54] INDEX-PRINTED PHOTOGRAPH DP BAG, INDEX-PRINTED PHOTOGRAPH FILM BAG AND INDEX PRINT SHEET THEREOF

[75] Inventor: Tohru Ishii, Tokyo-to, Japan

[73] Assignee: Dai Nippon Printing Co., Ltd., Tokyo-to, Japan

[21] Appl. No.: 08/798,086

[22] Filed: Feb. 12, 1997

[30] Foreign Application Priority Data

Feb. 13, 1996 [JP] Japan ................................... 8-048470

[51] Int. Cl.$^6$ ................................................. G03D 27/52
[52] U.S. Cl. .......................... 355/40; 206/455; 396/661
[58] Field of Search .............................. 396/661; 355/40, 355/41; 206/455

[56] References Cited

U.S. PATENT DOCUMENTS 5,546,155  8/1996  Yamamoto ............................... 361/661

FOREIGN PATENT DOCUMENTS

| 0550885 | 7/1993 | European Pat. Off. .......... G03C 3/00 |
| 0624823 | 11/1994 | European Pat. Off. ....... G03D 15/00 |
| 19502826 | 8/1995 | Germany ...................... G03C 11/02 |
| 7234496 | 9/1995 | Japan ........................... G03D 15/10 |

*Primary Examiner*—D. Rutledge
*Attorney, Agent, or Firm*—Ladas & Parry

[57] ABSTRACT

A photograph DP bag (10) is provided with: a bag main body (11, 12) for accommodating at least one of a printed photograph and a developed photograph film therein and having a receiver layer for sublimation-transcription at a surface thereof; and an index print (15) of a positive image of the developed photograph film, which is printed on the receiver layer of the bag main body by a sublimation-transcribing method

18 Claims, 8 Drawing Sheets

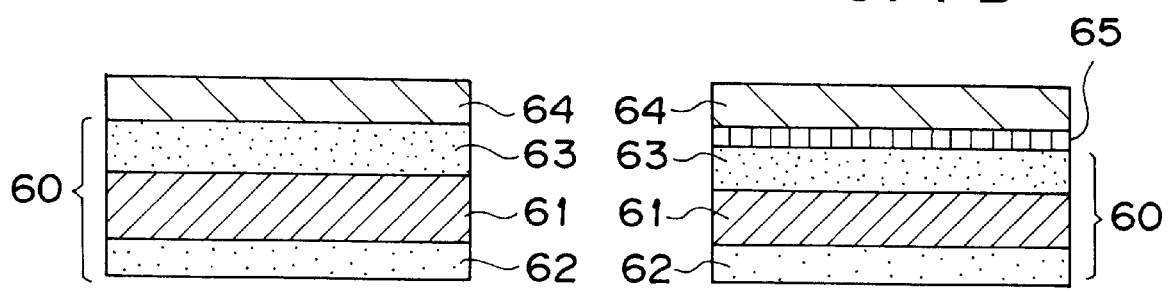
FIG. 7A
FIG. 7B
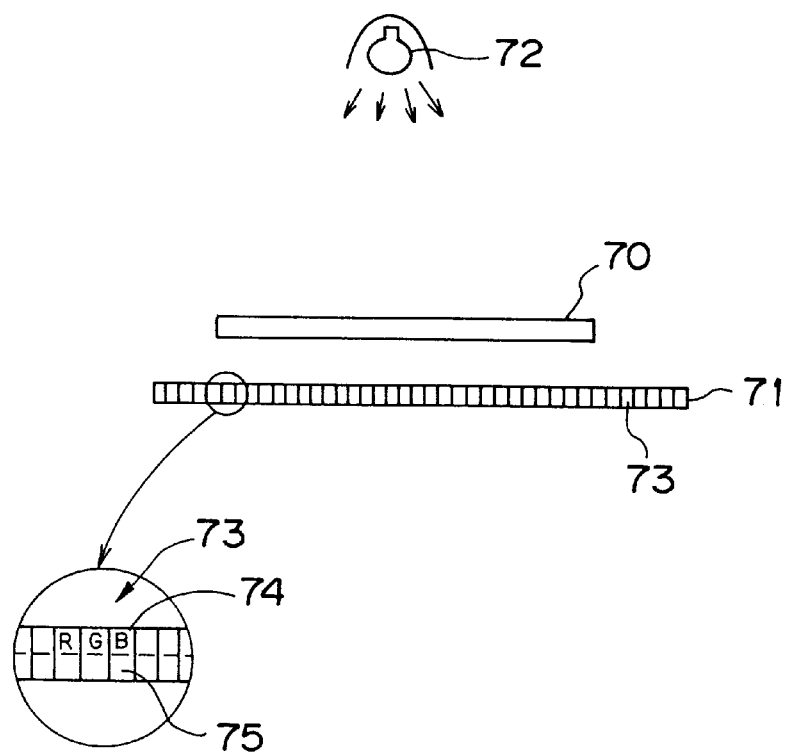
FIG. 8

INDEX-PRINTED PHOTOGRAPH DP BAG, INDEX-PRINTED PHOTOGRAPH FILM BAG AND INDEX PRINT SHEET THEREOF

BACKGROUND OF THE INVENTION

1. Field of the Invention

The present invention generally relates to a photograph DP (Developing and Printing) bag for printed photographs, a negative bag for developed negative films and an index print sheet for those bags, and more particularly to the photograph DP bag, the negative bag and the index print sheet, which are index-printed by means of a sublimation-transcribing technique and which are used at a time of delivering the printed photographs and the developed negative films between a developer laboratory and a photograph DP store and between the photograph DP store and a customer.

2. Description of the Related Art

At the photograph DP store, to which the developing of a photographic film and the simultaneous printing of photographs from the developed negative film are ordered by a customer, the delivery of the developed negative films and the printed photographs is performed by inserting the developed negative films in the negative bag and further inserting the negative bag as well as the printed photographs in the photograph DP bag.

As shown in FIG. 9, this kind of set of bags generally consist of: a photograph DP bag 80, which is a large-sized type bag for accommodating the printed photographs and a negative bag 81; the negative bag 81 for accommodating a transparent or translucent negative sheet bag 82; and the negative sheet bag 82 for accommodating a developed negative film 83, which is developed, is cut into pieces by a predetermined photograph frame unit, and is inserted in and protected by the transparent or translucent negative sheet bag 82. An entry field 84, a customer name column, a photograph DP store name column, etc. to order re-printing, are provided on the photograph DP bag 80.

In case that the customer orders re-printing, the picture plane (photograph frame) of the developed negative film 83 is specified to be re-ordered through the transparent or translucent negative sheet 82. However, since the transparent or translucent negative sheet 82 accommodates the developed negative film 83 as it is, which is expressed by complementary colors of the real colors, there is a problem that it is very difficult for ordinary people to recognize what kind of picture plane is actually displayed in each photograph frame on the developed negative film 83.

Accordingly, it takes time for the customer to specify the picture plane to be printed at the photograph DP store in case of ordering the re-print, or the picture plane may be erroneously specified so that the credit of the photograph DP store is lost and that the customer suffers from the trouble and cost damage, which is another problem.

Further, since the customer pulls out the developed negative film 83 from the transparent or translucent negative sheet 83 and/or touches the surface of the developed negative film 83 by a finger, the developed negative film 83 is soiled or blurred, or is even scratched to be damaged, so that the print quality is certainly degraded after that, which is another problem.

In order to solve the above explained problems, there may be proposed a technique to form a positive image, which is contact-printed or scale-reduction-printed by applying the silver-salt photographing method or the other photographing methods to the developed negative film, directly on the photograph DP bag or the negative bag, so that the re-print can be specified by use of this positive image. However, such a technique is rather difficult to be realized since it generally requires the process same as the general photograph printing process, resulting in a high cost and since the process of forming the photosensitive material on a body of the photograph DP bag or the negative bag is rather difficult while the photosensitive material must be handled very carefully in that occasion.

Further, in the photograph business world, it may be reviewed to stop the conventional way of delivering the developed negative film after cutting it into pieces and inserting them in the transparent or translucency negative sheet, and to adopt a new way of returning the developed negative film as it is in a patorone (i.e. a film cartridge) and performing the re-printing by use of the index print. In this case, however, there would be the same problems as the above mentioned technique of forming the positive image on the photograph DP bag or the negative bag.

SUMMARY OF THE INVENTION

It is therefore an object of the present invention to provide an index-printed photograph DP bag for printed photographs, an index-printed negative bag for developed negative films, and an index print sheet thereof, which allows an easy formation of the positive image at a low cost with a high image quality as compared with the photographic print, by use of a sublimation-transcribing technique.

The above object of the present invention can be achieved by a first photograph DP bag provided with: a bag main body for accommodating at least one of a printed photograph and a developed photograph film therein and having a receiver layer for sublimation-transcription at a surface thereof; and an index print of a positive image of the developed photograph film, which is printed on the receiver layer of the bag main body by a sublimation-transcribing method.

According to the first photograph DP bag, since the positive image is formed on the bag main body, it is possible to recognize and specify each photograph frame of the developed photograph film on the positive image, without the necessity of observing the developed photograph film (e.g. the developed negative film) itself.

In one aspect of the first photograph DP bag, a perforated line portion is formed in the surface of the bag main body around the index print to split off one portion of the main body on which the index print is printed from another portion of the bag main body.

According to this aspect, it is possible to easily split off the index print, from the bag main body so that the customer can preserve and appreciate the index print itself.

In another aspect of the first photograph DP bag, it is further provided with a transparent or translucent order sheet overlapped on the index print and having a format to order re-printing based on the index print visible therethrough.

According to this aspect, it is possible to easily specify each photograph frame to order re-printing by watching the index print through the order sheet while writing the order on the order sheet.

In another aspect of the first photograph DP bag, the index print includes a film identification code to identify the developed photograph film, which code number is the same as a film identification code attached on the developed photograph film.

According to this aspect, by comparing the film identification code of the index print with that of the developed photograph film, it is possible to prevent the developed photograph films from being mistaken as each other at a time of re-printing.

The above object of the present invention can be also achieved by a second photograph DP bag provided with: a bag main body having a surface, for accommodating at least one of a printed photograph and a developed photograph film therein; and an index print sheet attached on the surface of the bag main body and having a receiver layer for sublimation-transcription at a surface thereof; and an index print of a positive image of the developed photograph film, which is printed on the receiver layer of the index print sheet by a sublimation-transcribing method.

According to the second photograph DP bag, since the index print sheet on which the positive image is formed is attached on the bag main body, it is possible to recognize and specify each photograph frame of the developed photograph film on the positive image on the index print sheet In one aspect of the second photograph DP bag, a perforated line portion is formed in the surface of the index print sheet to split off one portion of the index print sheet on which the index print is printed from another portion of the index print sheet attached on the bag main body.

According to this aspect, it is possible to easily split off the index print sheet, from the bag main body so that the customer can preserve and appreciate the index print sheet.

In one aspect of the second photograph DP bag, the photograph DP bag is further provided with a transparent or translucent order sheet overlapped on the index print and having a format to order re-printing based on the index print visible therethrough.

According to this aspect, it is possible to easily specify each photograph frame by watching the index print through the order sheet on the index print sheet.

In one aspect of the second photograph DP bag, the index print includes a film identification code to identify the developed photograph film, which code number is the same as a film identification code attached on the developed photograph film.

According to this aspect, it is possible to prevent the developed photograph films from being mistaken as each other at a time of re-printing.

The above object of the present invention can be also achieved by a third photograph DP bag provided with a bag main body for accommodating at least one of a printed photograph and a developed photograph film. The bag main body has a front sheet portion and a rear sheet portion opposed to each other and prescribing an internal space of the bag main body therebetween. At least one of the front sheet portion and the rear sheet portion comprises a receiver sheet for sublimation-transcription.

According to the third photograph DP bag, since the front sheet portion and/or the rear sheet portion is the receiver sheet, it is possible to print the positive image on the front or rear sheet of the bag main body by the sublimation-transcribing method.

The above object of the present invention can be also achieved a first photograph film bag provided with: a bag main body having a front sheet and a rear sheet, for inserting a developed photograph film therein, at least one of the front sheet and the rear sheet comprising a receiver sheet for sublimation-transcription; and an index print of a positive image of the developed photograph film, which is printed on the receiver sheet of said at least one of the front sheet and the rear sheet by a sublimation-transcribing method.

According to the first photograph film bag, since the positive image is formed on the bag main body, it is possible to recognize and specify each photograph frame of the developed photograph film on the positive image, without the necessity of observing the developed photograph film.

In one aspect of the first photograph film bag, the first photograph film bag is further provided with a transparent or translucency order sheet overlapped on the index print and having a format to order re-printing based on the index print visible therethrough.

According to this aspect, it is possible to easily specify each photograph frame by watching the index print through the order sheet on the first photograph film bag.

In another aspect of the first photograph film bag, the index print includes a film identification code to identify the developed photograph film, which code number is the same as a film identification code attached on the developed photograph film.

According to this aspect, it is possible to prevent the developed photograph films from being mistaken as each other at a time of re-printing.

The above object of the present invention can be also achieved by a second photograph film bag provided with: a bag main body having an external surface and an end leave for inserting a developed photograph film therein; and a receiver layer for sublimation-transcription, formed on at least one of the external surface and the end leave of the bag main body.

According to the second photograph film bag, since the receiver layer is formed on the external surface and/or the end leave of the bag main body, it is possible to print the positive image on the external surface or the end leave of the bag main body by the sublimation-transcribing method.

In one aspect of the second photograph film bag, the second photograph film bag is further provided with an index print of a positive image of the developed photograph film, which is printed on the receiver layer by a sublimation-transcribing method.

According to this aspect, since the positive image is formed on the external surface or the end leave of the bag main body, it is possible to recognize and specify each photograph frame of the developed photograph film on the positive image.

In this aspect, the second photograph film bag may be further provided with a transparent or translucent order sheet overlapped on the index print and having a format to order re-printing based on the index print visible therethrough. The index print may include a film identification code to identify the developed photograph film, which code number is the same as a film identification code attached on the developed photograph film.

The above object of the present invention can be also achieved by an index print sheet, which is accommodated in a photograph film bag for accommodating a developed photograph film or a photograph DP bag for accommodating the photograph film bag and a printed photograph. The index print sheet is provided with: a sheet main body having a surface; a receiver layer for sublimation-transcription formed on the surface of the sheet main body; and an index print of a positive image of the developed photograph film, which is printed on the receiver layer of the sheet main body by a sublimation-transcribing method. The index print includes a film identification code to identify the developed photograph film, which code number is the same as a film identification code attached on the developed photograph film.

According to the index print sheet of the present invention, since the positive image is printed in the index print, it is possible to recognize and specify each photograph frame of the developed photograph film on the positive image, while, since the film identification code is included in the index print, it is possible to prevent the developed photograph films from being mistaken as each other at a time of re-printing.

In one aspect of the index print sheet, the index print sheet is further provided with a transparent or translucent order sheet overlapped on the index print and having a format to order re-printing based on the index print visible therethrough.

According to this aspect, it is possible to easily specify each photograph frame by watching the index print through the order sheet on the index print sheet.

As described above, according to the present invention, the photograph DP bag, the photograph film bag (e.g. the negative bag) and the index print sheet, which can be easily elaborated or assembled to a bag structure, which does not require the rather difficult photographing processes, such as a light exposing process, a developing process etc., and which can be easily handled, can be realized. Since the index print is formed on the photograph DP bag, the photograph film bag or the index print sheet, the customer can make an order for re-printing without watching the developed photograph film (e.g. the developed negative film).

Further, since the picture quality as high as the photograph print can be obtained by the sublimation-transcribed print, it is worth preserving and appreciating the index print itself.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7A is a cross-sectional view of one example for a receiver sheet for sublimation-transcription used for the present embodiments;

FIG. 7B is a cross-sectional view of another example for a receiver sheet for sublimation-transcription used for the present embodiments;

FIG. 8 is a diagram showing an image formation process of forming the positive image on the index print sheet of the present embodiments.

DETAILED DESCRIPTION OF THE PREFERRED EMBODIMENTS

Referring to the accompanying drawings, embodiments of the present invention will be now explained.

(1) First Embodiment

Figure 1A:
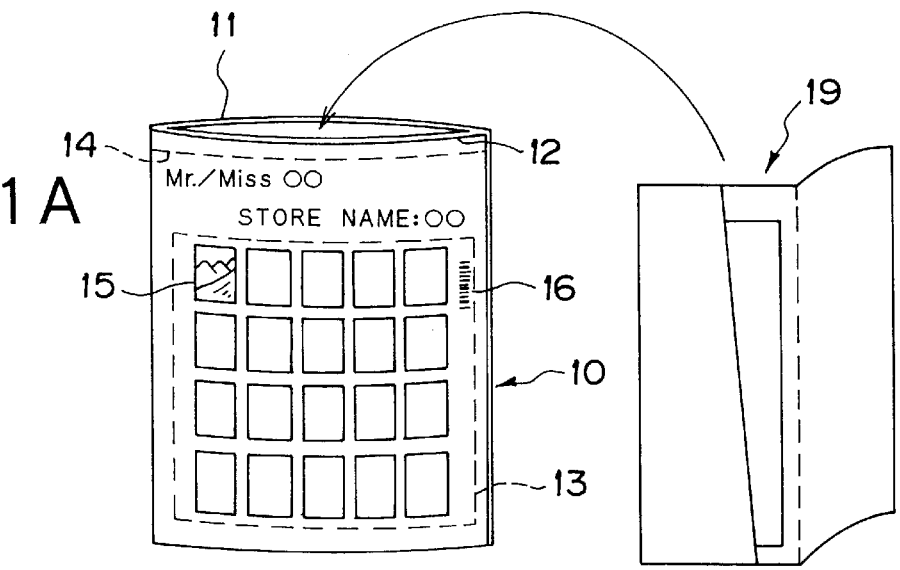
FIG. 1A is a perspective view of an index-printed photograph DP bag as a first embodiment of the present invention, in a condition where a negative bag is being inserted to it.
Figure 1B:
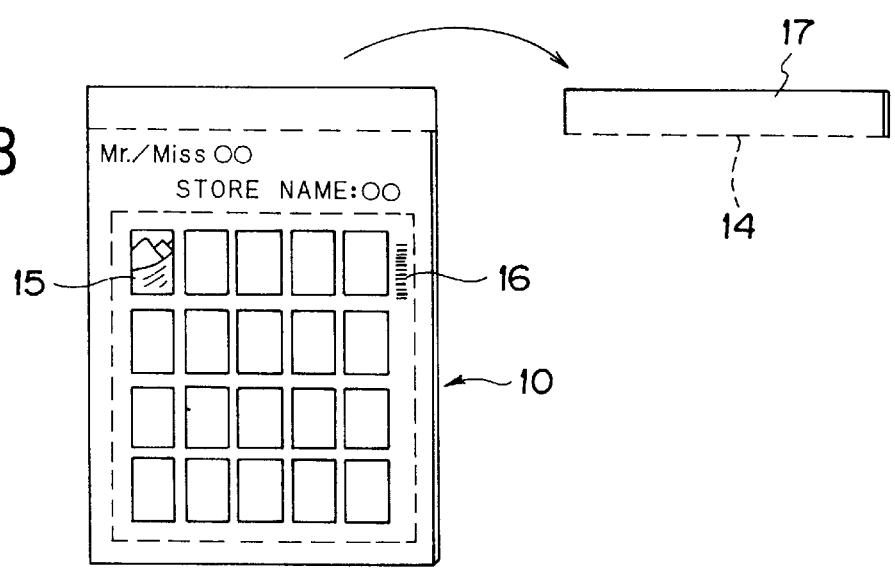
FIG. 1B is a plan view of the index-printed photograph DP bag of FIG. 1A, in a condition where a customer receives and opens it.

Each of FIGS. 1A and 1B shows a photograph DP bag as a first embodiment of the present invention.

In FIG. 1A, a photograph DP bag 10 is provided with a front sheet 11 in a rectangular shape, and a rear sheet 12 consisting of a receiver sheet for sublimation-transcription on which a positive image is formed to be an index print 15. The front sheet 11 and the rear sheet 12 are bonded together at both side edge portions thereof and at bottom edge portions thereof. The sizes of the front sheet 11 and the rear sheet 12 may be coincident to each other. Alternatively, the front sheet 11 may be formed longer in a longitudinal direction than the rear sheet 12 so that a folded portion is formed of the front sheet 11 at an opening of the photograph DP bag 10.

An entry field for writing a customer's name, a photograph DP store name, a DP store code, a type of photographic film, a print specification, a reception date, etc., is provided on the front sheet 11. Alternatively, such an entry field may be fully or partially provided on a peripheral portion of the rear sheet 12 where the index print 15 is not printed. An entry field for writing a print specification content for re-printing may be provided for each photographic frame on the photograph DP bag 10 as in the conventional manner.

On the other hand, the rear sheet 12 of the photograph DP bag 10 consists of a receiver sheet for sublimation-transcription on which a positive image is formed. The surface of the rear sheet 12 is not index-printed but is blank at a time of receiving an order from the customer. It is possible to print an ornamental pattern or an entry item field to the receiver sheet by applying a general print to a surface of a base material sheet of the receiver sheet before forming a receiver layer on the base material sheet.

At a time of delivering or returning the photograph DP bag 10 to the customer, the photograph DP bag 10, in which the printed photographs and a negative bag 19 (into which the developed negative film are inserted) are accommodated and on which the index print 15 is printed, is delivered to the customer. This index print 15 is printed by the sublimation-transcribing technique, and as described later in detail, it is formed on the receiver sheet, by outputting a color separated signal, which is obtained by scanning the developed negative film by a CCD (Charged Coupled Device) line sensor, by use of a sublimation-transcribing printer and a sublimation-transcribing ribbon. As the index print 15, it is preferable to print out portions of the film before its first photograph frame and after its last photograph frame, each of which has not been exposed for photographing and is actually useless, so as to prove the fact that all of the photograph frames are printed.

It is also preferable to attach a film identification code 16 such as a bar-code for identifying the developed negative film on the index print 15, and attach a film identification code having the same code number as the film identification code 16 on a predetermined portion of the developed negative film inserted in the negative bag 19, so that it is possible to prevent the developed negative films from being mistaken as each other at a time of re-printing.

If possible, the coincidence between the code numbers of those film identification codes on the developed negative film and the index print is confirmed preferably at the photograph DP store before transporting the photograph DP bag 10 to the developer laboratory, and more preferably at the presence of the customer.

The customer can specify re-printing by watching the index print 15 without the necessity of watching the developed negative film, so that the developed negative film can be prevented from being soiled or blurred, or being scratched to be damaged.

It is preferable to attach a number, a bar code etc. on a photograph starting portion or a header portion of the developed negative film without cutting it, or to a patorone itself or a header portion of the developed negative film in case of inserting the developed negative film in the patorone when returning it to the customer.

It is possible to attach the film identification code on the index print by printing the film identification code such as a bar code by the sublimation-transcribing printer.

A perforated line portion 13 for splitting may be provided at a peripheral of the index print 15, for the convenience at a time of preserving and appreciating the index print 15 itself in an album etc. In this case, it is preferred that the film identification code 16 is positioned within the area prescribed by the perforated line portion 13, so that it can be preserved together with the index print 15.

It is preferable that a perforated line portion 14 is provided along a top portion 17 of the photograph DP bag 10 so that the customer can easily open the photograph DP bag 10 by splitting off the top portion 17 of the photograph DP bag 10 when the customer receives the photograph DP bag 10 as shown in FIG. 1B.

(2) Second Embodiment

Figure 2A:
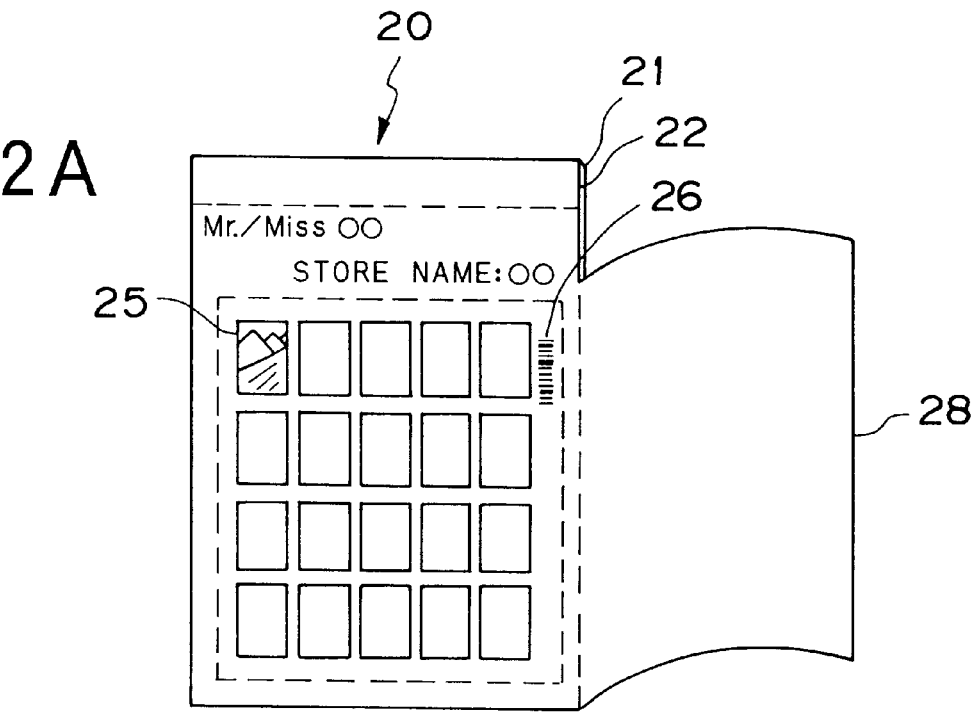
FIG. 2A is a perspective view of an index-printed photograph DP bag as a second embodiment of the present invention.

FIG. 2A shows a photograph DP bag as a second embodiment of the present invention.

Figure 2B:
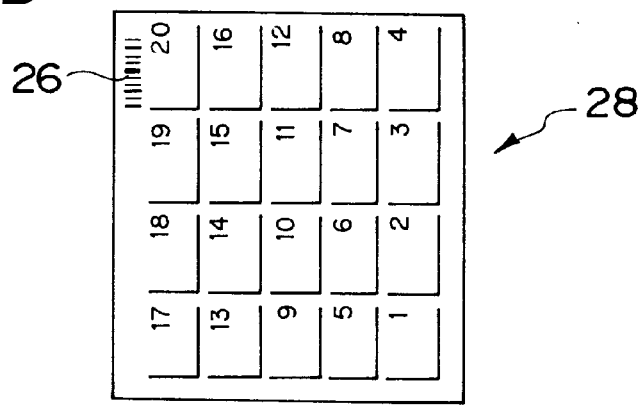
FIG. 2B is a plan view of an order sheet of the index-printed photograph DP bag of FIG. 2A.

In FIG. 2A, a photograph DP bag 20 is provided with: a front sheet 21, which consists of a plain paper in a rectangular shape; a rear sheet 22, which consists of a receiver sheet for sublimation-transcription and on which the positive image is formed to be an index print 25; and an order sheet 28 to order re-printing, which is disposed at a surface side of the rear sheet 22, in such a condition that it can be folded on the index print 25. The order sheet 28 preferably consists of a transparent or translucency sheet, so that the index print 25 be visible through the order sheet 28. On the surface of the order sheet 28, frame numbers and frame lines corresponding to the frames are printed as shown in FIG. 2B, so that the specification of the number of prints as well as each frame number can be written thereon. It is preferred that a film identification code 26 is printed on the rear sheet 22 (on the index print 25 as shown in FIG. 2A) as well as the order sheet 28 (as shown in FIG. 2B).

(3) Third Embodiment

Figure 3A:
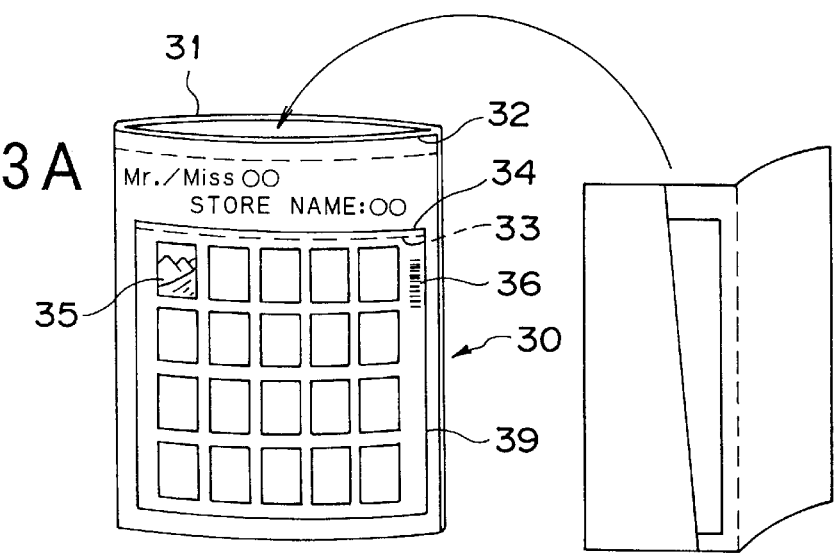
FIG. 3A is a perspective view of an index-printed photograph DP bag as a third embodiment of the present invention, in a condition where a negative bag is being inserted to it.
Figure 3B:
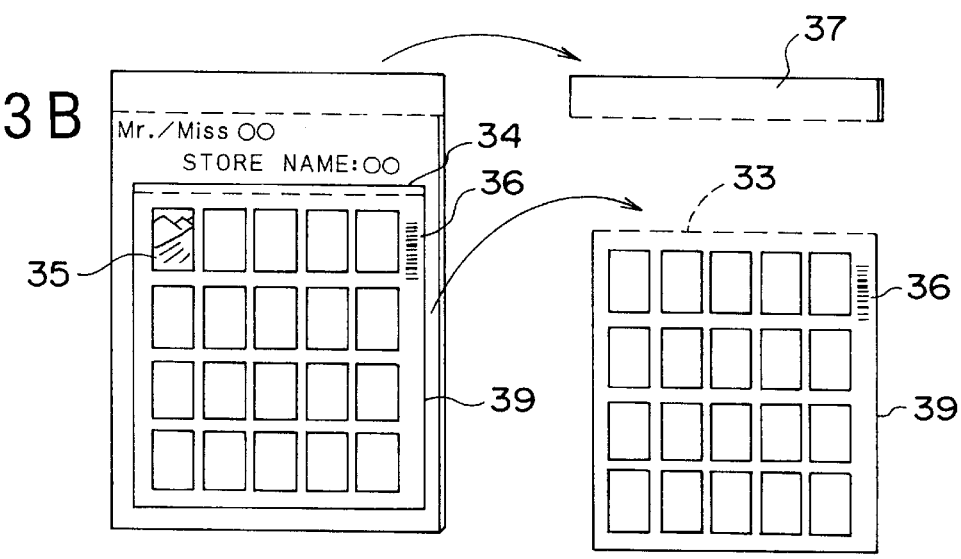
FIG. 3B is a plan view of the index-printed photograph DP bag of FIG. 3A, in a condition where a customer receives, opens it and splits off an index print sheet.

Each of FIGS. 3A and 3B shows a photograph DP bag as a third embodiment of the present invention.

In FIG. 3A, a photograph DP bag 30 is provided with: a front sheet 31 and a rear sheet 32, each of which consists of a plain paper in a rectangular shape; and an index sheet 39, which is index-printed by the sublimation-transcribing method and which is bonded at an overlap width portion 34 thereof on a surface of the rear sheet 32. The index print sheet 39 consists of a receiver sheet for sublimation-transcription and on which the positive image is formed to be an index print 35 by the color separated signal as mentioned before. The index print sheet 39 may be bonded in such a manner that the printed surface is directed to a front side or a rear side thereof. From the view point of protecting the privacy, the latter is more preferable.

The index print sheet 39 is constructed such that it can be split off at a perforated line portion 33 which is formed at the overlap width portion 34, so that it can be preserved and appreciated, as shown in FIG. 3B. It is preferable that another perforated line portion is provided along a top portion 37 of the photograph DP bag 30 so that the customer can easily open the photograph DP bag 30 by splitting off the top portion 37 when the customer receives the photograph DP bag 30 as shown in FIG. 3B.

Figure 3C:
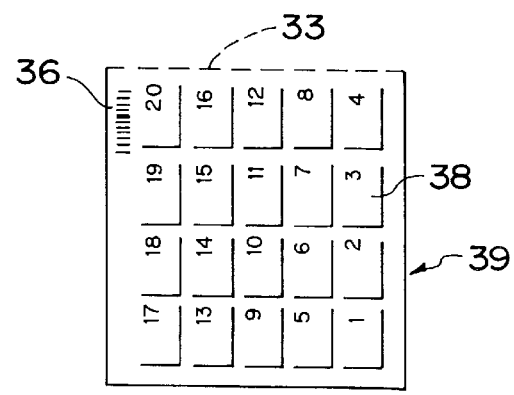
FIG. 3C is a plan view of the index print sheet at a rear surface thereof (i.e. an order sheet) of the index-printed photograph DP bag of FIG. 3A.

It is possible to write the order for re-printing to a margin of the index print sheet 39. Alternatively, it is possible to print a format 38 of an order sheet for re-printing on the rear surface of the index print sheet 39 as shown in FIG. 3C, and write the order thereon. Namely, the index print sheet 39 functions as the order sheet when it is inverted. It is preferable that a film identification code 36 is included in the format 38 on the rear surface of the index print sheet 39 (FIG. 3C) as well as on the front surface of the index print sheet 39 (FIGS. 3A and 3B).

(4) Fourth Embodiment

Figure 4A:
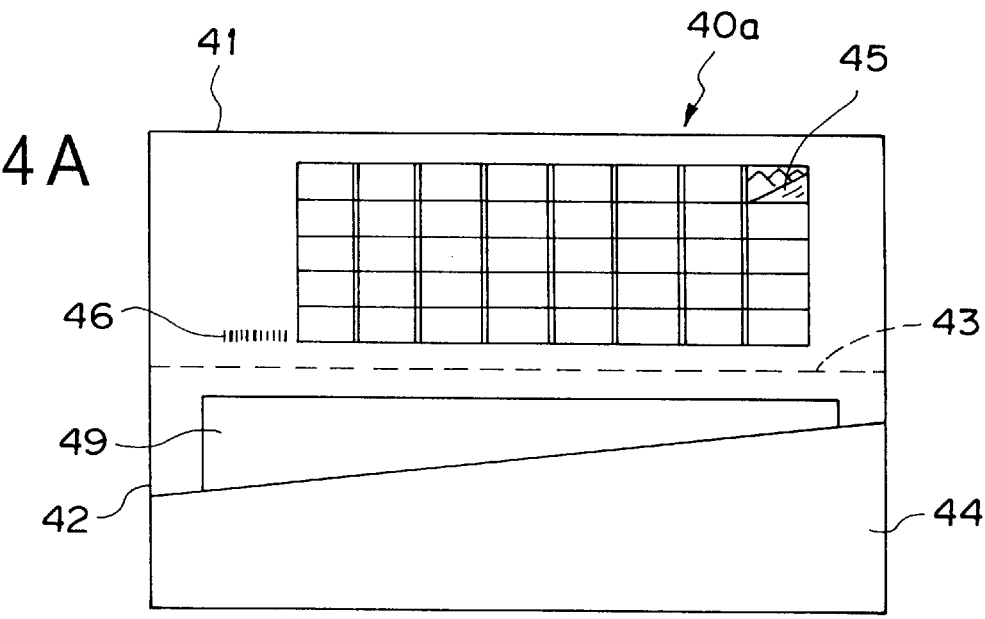
FIG. 4A is a plan view of an index-printed negative bag as a fourth embodiment of the present invention.

FIG. 4A shows a negative bag as a fourth embodiment of the present invention.

In FIG. 4A, an index print 45 is printed on a negative bag 40a for developed negative films. The negative bag 40a is provided with: a front sheet 41, which consists of a receiver sheet for sublimation-transcription in a rectangular shape; and a rear sheet 42, which consists of a plain paper. The front sheet 41 and the rear sheet 42 are bonded together into one body at portions thereof along a folded line 43. It is also possible to form the front sheet 41 and the rear sheet 42 in one body with each other out of one receiver sheet for sublimation-transcription, although the cost is slightly increased in this case. In this case, there is no need bonding along the folded line 43. A folded portion 44 is formed of the rear sheet 42 to which a transparent or translucency negative sheet 49 is inserted, such that the front sheet 41 is folded onto the folded portion 44 to protect the negative sheet 49 therebetween.

It is preferred that a film identification code 46, which has the same code number as the film identification code attached on the developed negative film protected by the negative sheet 49, is attached to the index print portion of the negative bag 40a, in the same manner as the other embodiments.

Figure 4B:
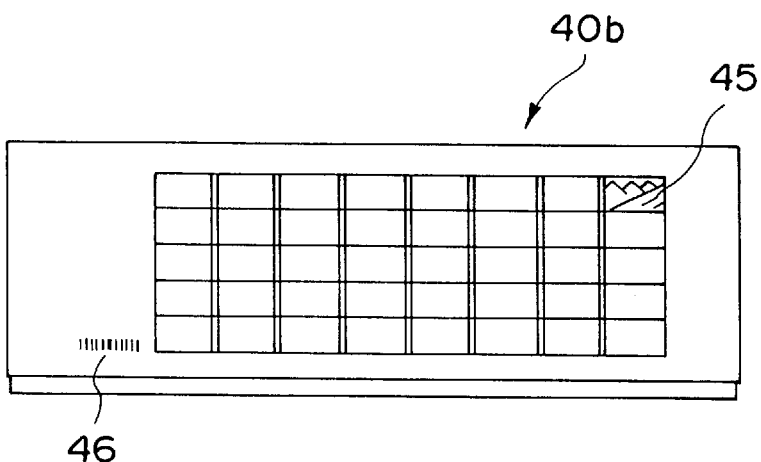
FIG. 4B is a plan view of an index-printed negative bag as a modified fourth embodiment of the present invention.

In the fourth embodiment, the index print 45 is formed on the inner surface of the negative bag 40a as shown in FIG. 4A. However, the index print 45 may be formed on the outer surface of a negative bag 40b as shown in FIG. 4B, which is a modified embodiment of the fourth embodiment. Other than that, the negative bag 40b has the same construction as the negative bag 40a. In either case, since the index print 45 can be printed onto a single sheet layer in such a condition that the negative bag is opened, the high image quality of printing can be assured.

In the case shown in FIG. 4A, since the index print 45 is on the inner surface of the negative bag 40a, it is superior from the view point of the long term preservation and the protection of the privacy. On the other hand, even in the case shown in FIG. 4B, since the whole body of the negative bag 40b is inserted or accommodated in the photograph DP bag, the index print 45 is not seen by other customers in the photograph DP store.

(5) Fifth Embodiment

Figure 5A:
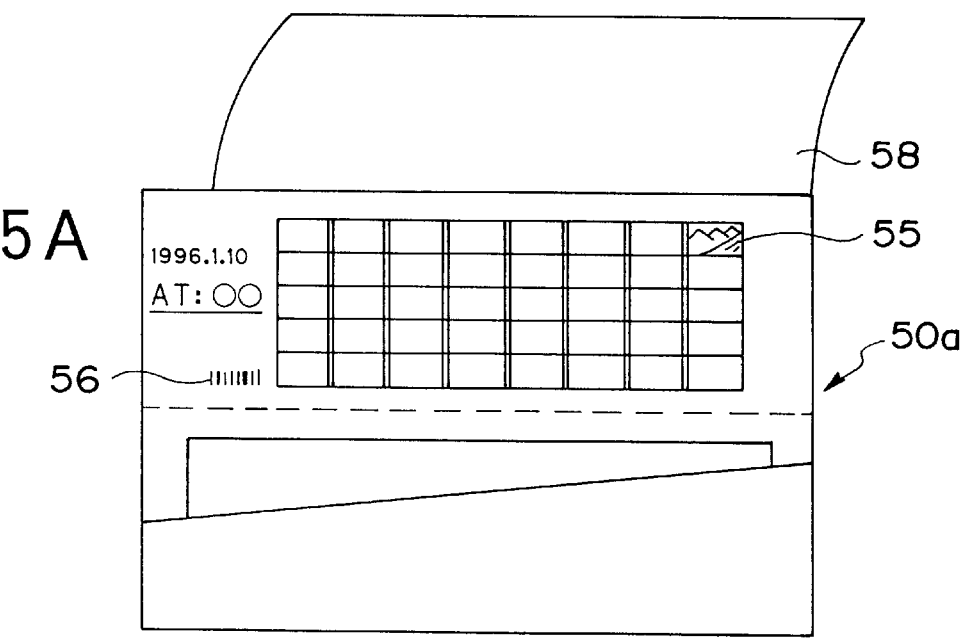
FIG. 5A is a plan view of an index-printed negative bag as a fifth embodiment of the present invention.

FIG. 5A shows a negative bag as a fifth embodiment of the present invention.

In FIG. 5A, a negative bag 50a is constructed by attaching an order sheet 58 to order re-printing to a construction of the negative bag 40a of the fourth embodiment such that the order sheet 58 can be folded onto an index print 55. The order sheet 58 is preferably transparent or translucent so that the index print 55 can be seen through the order sheet 58.

It is preferred that a film identification code 56, which has the same code number as the film identification code attached on the developed negative film is attached to the index print portion of the negative bag 50a, in the same manner as the other embodiments.

Figure 5B:
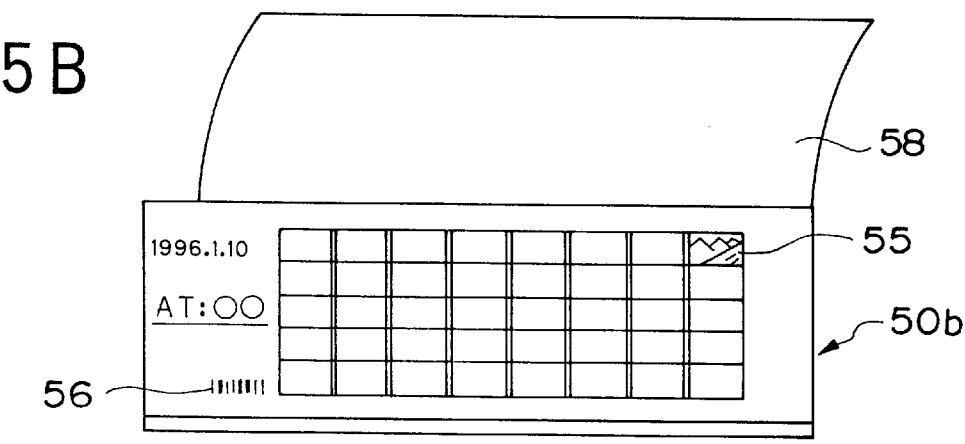
FIG. 5B is a plan view of an index-printed negative bag as a modified fifth embodiment of the present invention.

In the fifth embodiment, the index print 55 is formed on the inner surface of the negative bag 50a as shown in FIG. 5A. However, the index print 55 may be formed on the outer surface of a negative bag 50b as shown in FIG. 5B, which is a modified embodiment of the fifth embodiment. Other than that, the negative bag 50b has the same construction as the negative bag 50a. Namely, the negative bag 50b is constructed by attaching the order sheet 58 to a construction of the negative bag 40b of the modified fourth embodiment such that the order sheet 58 can be folded onto the index print 55.

Figure 5C:
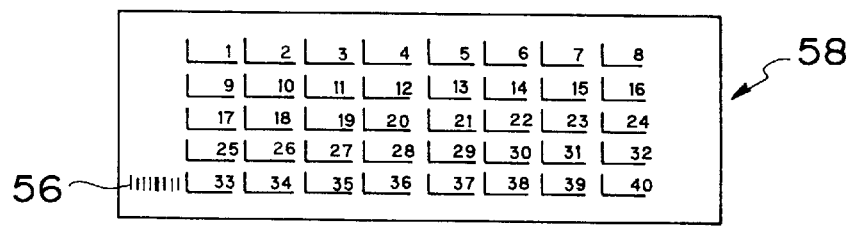
FIG. 5C is a plan view of an order sheet of the index-printed negative bag of FIG. 5A or 5B.

An order format is printed on the surface of the order sheet 58, so that the number of prints as well as the frame number etc. can be specified as shown in FIG. 5C.

The order sheet 58 is not really necessary if the necessary entry items can be directly written to the margin of the index print 55 of the sixth embodiment.

(6) Sixth Embodiment

Figure 6:
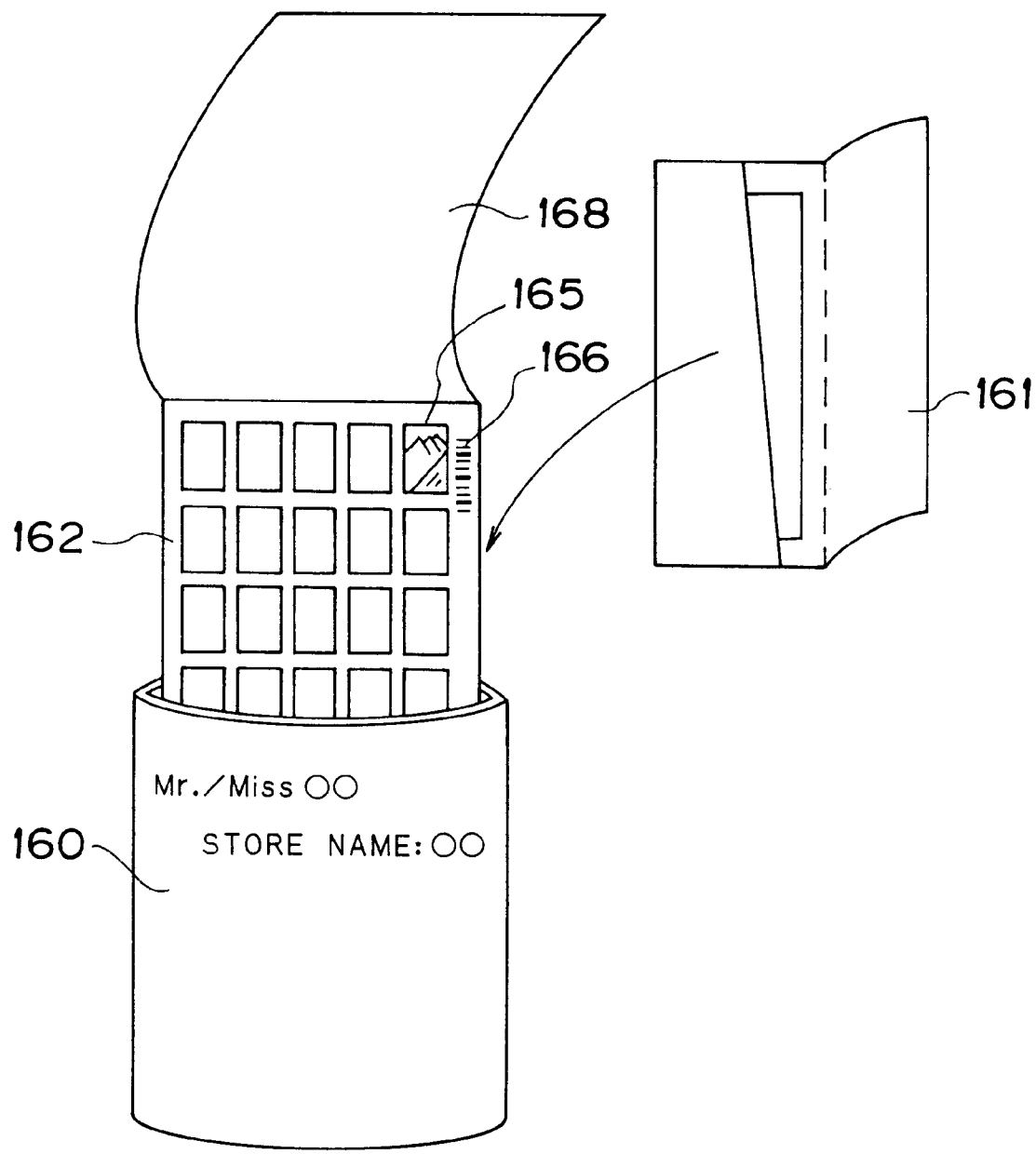
FIG. 6 is a perspective view of a set of an index-print sheet, a negative bag and a photograph DP bag as a sixth embodiment of the present invention.
Figure 9:
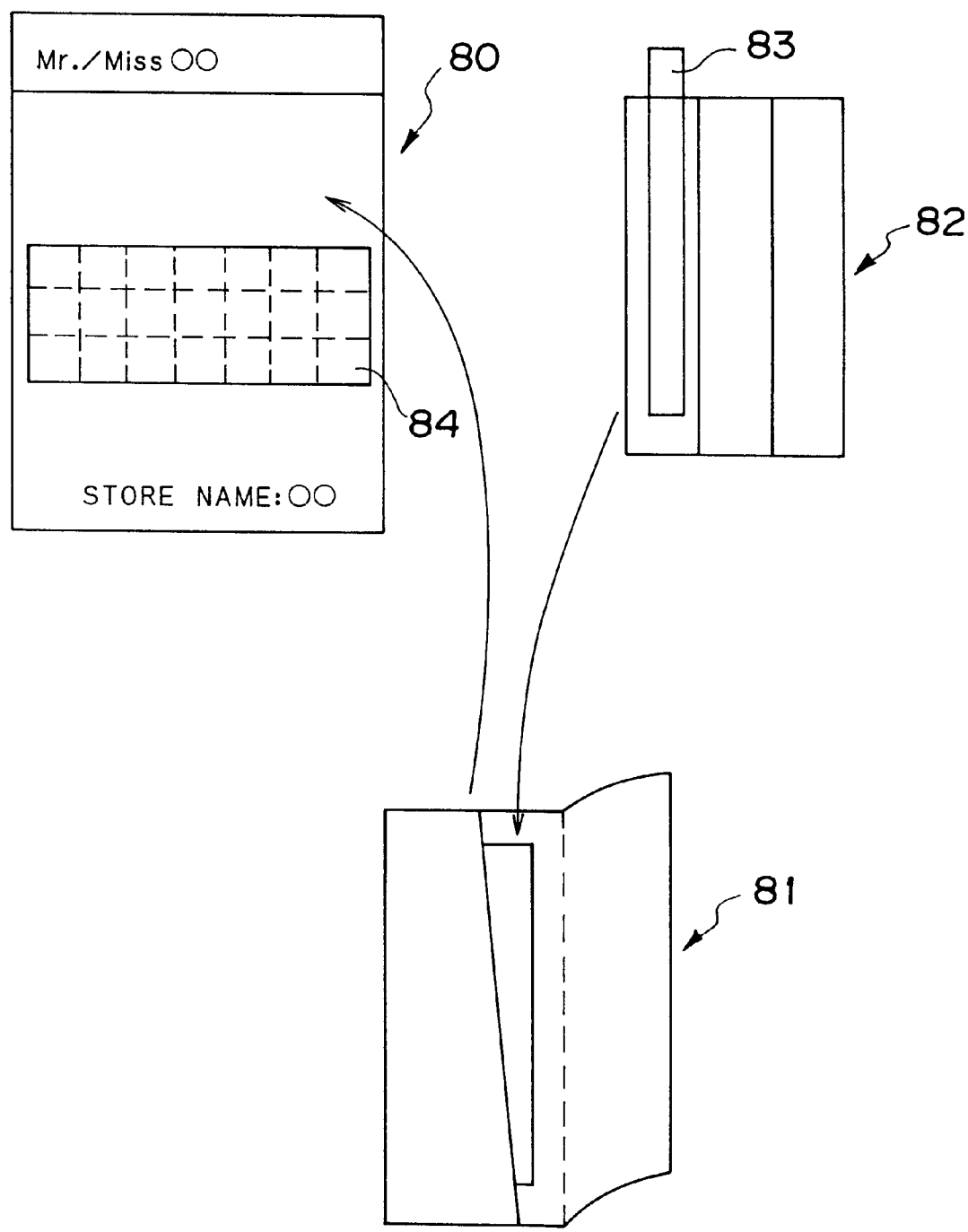
FIG. 9 is a plan view of a set of a photograph DP bag, a negative bag and a transparent or translucency negative sheet according to a prior art of the present invention.

FIG. 6 show a set of a photograph DP bag, and a negative bag and an index printed sheet which are accommodated in the photograph DP bag, as a sixth embodiment of the present invention.

In FIG. 6, a photograph DP bag 160 accommodates a negative bag 161 and an index print sheet 162. On the index print sheet 162, an index print 165 is printed, and a film identification code 166, which code number is coincident with that of the film identification code attached to the developed negative film inserted in the negative bag 161, is also printed. It is preferable that the film identification code 166 and the index print 165 are simultaneously printed by the sublimation-transcribing method. Namely, it is possible to output the color separated signal corresponding to the developed negative film by the sublimation-transcribing printer to print the index print 165, and at the same time, inputting the film identification code, converting it to the code such as a bar code, and outputting it by the sublimation-transcribing printer to print the film identification code 166. A transparent or translucency order sheet 168 on which a format to order re-printing (as shown in FIG. 2B) is preferably attached on the index print sheet such that the index print 165 can be seen through the order sheet 168, and the order sheet 168 can be peeled off.

Various kinds of photograph DP bags, negative bags and index print sheets have been explained above in detail. Although all of those bags and the index print sheets can be put into practice, in the first embodiment, it is preferred to carefully treat the photograph DP bag so as not to distort the photograph DP bag or generate the convex or concave deformation due to the patorone when the film (in the patorone) entrusted by the customer is transported to the developer laboratory, since the distortion or the convex or concave deformation gives a harmful influence onto the sublimation-transcribed prints.

Such a problem of distortion or deformation does not occur in the third embodiment, since the index print can be formed in the developer laboratory and the receiver sheet after printing can be bonded to the photograph DP bag. The index print sheet may be bonded in such a manner that the picture printed surface appears as its front surface or its rear surface.

Further, such a problem of distortion or deformation does not occur even when the index print is printed at the developer laboratory and returning it to the customer in the fourth or fifth embodiment either, since the transparent or translucency negative sheet is inserted into the negative bag, and the negative bag is further inserted into the photograph DP bag.

Furthermore, in the six embodiment, since the index print sheet is a single receiver sheet, a problem as for the print output quality does not occur.

The above described various kinds of photograph DP bags and negative bags can be produced in the same manner as the conventional method of producing a bag from a plain paper. Namely, it can be produced by general sheet process such as a folding process and a bonding process. The front surface and the rear surface of the receiver sheet for sublimation-transcription may comprise a plastic material or a synthetic paper as described later in detail, and it is possible to form the perforated line portion to the receiver sheet, cut the receiver sheet, and bonding the receiver sheet by means of general sheet processes.

Although it is preferable to prevent the surface for sublimation-transcription from being unnecessarily soiled or blurred or deformed in the produced photograph DP bag or the produced negative bag, it is not necessary to treat the surface for sublimation-transcription so carefully as the case of treating the photosensitive material.

(7) Construction of Receiver Sheet for Sublimation-Transcription

Next, a construction of the receiver sheet for sublimation-transcription, which is a constitutional element of the present invention, will be explained.

FIG. 7A shows one example for a construction of the receiver sheet for sublimation-transcription used for the photograph DP bags, the negative bags and the index print sheets of the above described embodiments.

In FIG. 7A, a receiver sheet is provided with a base material sheet 60 and a dye receiver layer 64. The base material sheet 60 is provided with a plain paper 61 interposed between synthetic papers 62 and 63. The dye receiver layer 64 is coated on the base material sheet 60.

FIG. 7B shows another example for a construction of the receiver sheet for sublimation-transcription used for the photograph DP bags, the negative bags and the index print sheets of the above described embodiments.

In FIG. 7B, the receiver sheet has the same construction as the receiver sheet of FIG. 7A except that an intermediate layer 65 is inserted between the base material sheet 60 and the dye receiver layer 64. The intermediate layer 65 gives a cushion property etc. to the receiver sheet, so that the quality of the image formation is improved by this insertion of the intermediate layer 65, as described later in detail.

Hereinbelow, the construction of each layer element of those receiver sheets will be explained in detail.

BASE MATERIAL SHEET

Since the base material sheet of the receiver sheet for sublimation-transcription holds the dye receiver layer or the intermediate layer and its own lamination structure, and since heat is applied to the base material sheet at a time of heat-transcription (e.g. sublimation-transcription), the base material sheet preferably has a mechanical strength in such a degree that it can be handled without difficulty in the heated condition during the printing operation. Therefore, as long as it has the mechanical strength in such a degree, the construction and material of the base material sheet is not specifically limited. For example, an woodfree paper, an art paper, a coat paper, a cast-coated paper, a synthetic resin or emulsion impregnated paper, a synthetic rubber latex impregnated paper, a synthetic resin additive paper, various plastic laminate paper, polyolefine type or polystyrene type synthetic papers and so on, can be used for the base material sheet. Further, films or sheets of various types of plastics such as polyester, polyacrylate, polycarbonate, polyurethane, polyimide, polyetherimide, cellulose derivative, polyethylene, ethylene-vinyl acetate copolymer, polypropylene, polystyrene, polyacrylonitrile, polyvinyl chloride, polyvinylidene chloride, polyvinyl alcohol, polyvinyl butyral, nylon (trade mark), polyetheretherketone (PEEK), polysulfone, polyethersulfone, tetrafluoroethylene-perfluoroalkylvinylether-copolymer, polyvinylfluoride, tetrafluoroethylene-ethylene copolymer, tetrafluoroethylene-hexafluoropropylene copolymer, polychlorotrifluoroethylene, polyvinylidenefluoride and so on, can be used for the base material sheet. Furthermore, a foam sheet which is foamed or a white non-transparent film which is film-formed by adding white pigment or filler to the above listed plastics, can be used for the base material sheet.

The lamination body comprising any combination of the above explained base material sheets can be also used for the base material sheet. As typical examples of the combination for the lamination body, there are a lamination body of the cellulose fiber paper and a synthetic paper, a lamination of the cellulose fiber paper and the plastic film or sheet, a lamination body of plastic films or sheets in different types or grades from each other, and so on. This kind of lamination body may consist of two layers, or three or more layers such that a coat paper or a white or transparent plastic film is used as a core material and synthetic papers or foam plastic films are bonded on both surfaces of the core material so as to exert feeling or texture of the base material.

In FIG. 7A, the base material sheet 60 consists of the plain paper 61 positioned as a core paper at the center and the synthetic papers 62 and 63 laminated on both surfaces of the plain paper 61.

Although there is no specific limitation as for the thickness of the base material sheet 60, the thickness in a range of 50 to 800 $\mu$m may be appropriate.

If the above described base material sheet 60 is poor in the bonding strength with a layer formed on its surface (i.e. the receiver layer 64 in FIG. 7A or the intermediate layer 65 in FIG. 7B), it is recommended to apply a corona discharge process, a plasma process, a primer coat process of various kinds etc., to the surface of the base material sheet 60, so as to improve the bonding strength.

DYE RECEIVER LAYER

Any known material used as the dye receiver layer in the heat transcribing method such as a sublimation-transcribing method, which comprises mainly a resin having dye-affinity to receive dye such as sublimation type dye transcribed from a heat transcribing sheet and to hold the formed dye image, can be used for the material of the dye receiver layer formed on one surface of the base material sheet. However, it is preferable that the dye receiver layer has a mold releasing property in such a degree to prevent a heat fusion of the heat transcribing sheet. Thus, the mold releasing agent of dye transparent type may be added to the material for the dye receiver layer, or a mold releasing layer may be formed on the dye receiver layer. Other than this, various additive agents such as a pigment may be added to the material for the dye receiver layer.

The coating amount of the dye receiver layer in a range of 2.5 to 5.0 g/m$^2$ in a solid state may be normally appropriate.

There may be formed at least one intermediate layer between the dye receiver layer and the base material sheet as shown in FIG. 7B. The intermediate layer may be any known intermediate layer possibly interposed between the dye receiver layer and the base material sheet, such as a bonding layer (primer layer), a white investiture layer, a barrier layer, a UV (Ultra Violet) absorbing layer, a foam layer, an antistatic (electrification preventing) layer and so on, as the occasion demands.

INTERMEDIATE LAYER

Between the base material sheet and the dye receiver layer, there may be formed the intermediate layer made of various resins as shown in FIG. 7B. By putting various roles on this intermediate layer, it is possible to add a superior capability to the receiver sheet for sublimation-transcription.

For example, it is possible to improve the printing sensitivity of the receiver sheet for sublimation-transcription and prevent the rough deposits on the formed image, by use of resins having a large plastic deformation property and a large elastic deformation property such as polyolefine type resins, vinyl type copolymer resins, polyurethane type resins, polyamide type resins, as the resin material exerting the cushion property. Other than that, if the intermediate layer is formed of a resin which glass transition temperature is not less than 60° C., or a resin hardened by hardening agent etc., it is possible to improve the preservation capability of the receiver sheets e.g., to prevent the receiver sheets from sticking to each other when preserved in a condition where a plurality of the receiver sheets are piled up.

FIG. 7B shows a construction of the receiver sheet for sublimation-transcription having the intermediate layer 65 between the base material sheet 60 and the dye receiver layer 64.

Further, the intermediate layer may be formed by coating the above listed resins into which an antistatic agent or a resin having the antistatic capability is solved by solvent or dispersed, so as to exert the antistatic capability.

Such an antistatic agent may comprise, for example, fatty acid ester, sulphate, phosphoric ester, amides, quaternary ammonium salt, betaines, amino acids, acrylic type resins, ethyleneoxide addition products and so on.

Such a resin having the antistatic capability may comprise, for example, an electrically conductive resin obtained by introducing or polymerizing radicals having the antistatic capability such as quarternary ammonium salt type radicals, phosphoric acid type radicals, ethosulfate type radicals, vinylpyrolidone type radicals, sulphonate acid type radicals, with respect to resins such as an acrylic resin, vinyl type resins, a cellulose resin. Especially, the cationic denaturation acrylic type resins are preferable.

Among those radicals having the antistatic property, the radical which can be introduced into the resin with the pendant shape is preferable since it can be introduced with high density. More concretely, JULIMER SERIES made by NIPPON JUNYAKU KABUSHIKI KAISHA, LEOLEX SERIES made by DAIICHI KOUGYOU SEIYKAKU KABUSHIKI KAISHA, ENCOND SERIES made by SOUKEN KAGAKU KABUSHIKI KAISHA and so on.

(8) Positive Image Forming Method

Nextly, the image forming method of forming the positive image from the negative or positive film on the receiver sheet for sublimation-transcription, which is constructed as explained above, is explained.

At first, a scanning process is performed by transporting the developed negative film on a CCD (Charge Coupled Device) line sensor, so that the picture plane of each photograph frame of the developed negative film is color-separated into three colors of B, G, R. Then, the obtained color-separated signal is transiently stored in a memory for each photograph frame as a digital signal. At this time, as a light source for irradiating the developed negative film, a halogen lamp or a xenon lamp which light is similar to the natural light is preferably used.

The color separated signal is outputted onto the receiver sheet for each color of yellow (Y), magenta (M), cyan (C) corresponding to B, G, R by the sublimation-transcribing printer through the sublimation-transcribing ribbon, so as to form the index print thereon.

Of course, it is possible to output the positive image by use of a reversal color film. In this case, the conversion of the color separated signal in the sublimation-transcribing printer is the positive image to the positive image, which is different from the conversion from the negative image to the positive image.

Further, in case that the photograph film is for a tungsten lamp, it is possible by the transcribing printer to perform an adjustment for obtaining the reproducibility close to that of the natural light.

FIG. 8 shows the process of color-separating the film on the CCD line sensor.

In FIG. 8, a film 70, which may be a developed negative film or a developed reversal color film, is scanned as moving on a CCD line sensor 71 under a light source 72 for color-separating such as a xenon light source.

Generally, a size of the pixel of the CCD, in which the width of one set of three color separated signals for B, G, R is fine, is about 18 $\mu$m. This is related to the arrangement density on the photo-detection element 73 of the CCD line sensor 71.

In the CCD line sensor 71, as shown in an enlarged view in FIG. 8, the photo-detection element 73 is constructed such that a color filter layer 74 for B, G, R respectively is formed on each photo-electric conversion element 75.

In case that the color separated signal is converted to the output image signal and is outputted onto the receiver sheet for sublimation-transcription, the line density of about 12 line/mm may be generally appropriate, since the line density of the thermal head at a time of thermal-transcription-printing is about such a value.

In case of the 35 mm film, since the picture plane size is 24 mm×36 mm, it is necessary to output the output image signal by the original size or by the slightly reduced size, in order to print the full picture plane for all 36 photograph frames onto one surface of the photograph DP bag (within an area of about B5 size, for example) shown in FIGS. 1, 2 or 3.

By the sublimation-transcribing printer, the color images are superimposed and transcribed by the ribbon of each color C, Y, M onto the receiver sheet for sublimation-transcription, so as to form the color positive image.

In FIGS. 4 or 5, in case of outputting the picture planes of 40 frames onto the negative bag, the scale is reduced by the factor of about ⅔, and the positive image is outputted at 8 frames×5 stages, so that all of the photograph frames can be arranged within the front surface or the end leave surface of the negative bag. In this case, if the scanning operation is performed by the CCD line sensor with the aforementioned scanning density, the signal actually obtained by the CCD line sensor is compressed or thinned by a factor of one/several with respect to the scanning direction as well as the width direction perpendicular to the scanning direction, to be outputted as the output image signal. Those techniques are known techniques disclosed by related technical documents.

The color separation for the developed negative film or the developed positive film is not limited to that by means of the CCD line sensor. Instead, the color separation is possible by means of the photoengraving process using the scanner.

As described above in detail, according to the present embodiments, since the index print is provided on the photograph DP bag or the negative bag, the contents of the photographs are obvious at a moment notice, so that the communication, the order and the delivery between the customer and the developer as well as between the photograph DP store and the developer laboratory can be smoothly conducted. Further, the present embodiments are superior from a view point of the preservation and the house keeping of the developed negative films.

Furthermore, since the production and preparation of the index print is not performed by means of the photograph color printing method, but by means of the sublimation-transcribing method by using the sublimation-transcribing ribbon and the receiver sheet, the formation of the positive image can be performed more economically and more easily than the silver salt photographing method.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A photograph DP bag comprising:
   a bag main body for accommodating at least one of a printed photograph and a developed photograph film therein and having a receiver layer for sublimation-transcription at a surface thereof; and
   an index print of a positive image of the developed photograph film which is printed on the receiver layer of said bag main body by a sublimation-transcribing method,
   the receiver layer comprising (i) an intermediate layer laminated on a base material sheet of said bag main body, the intermediate layer comprising a resin having a glass transition temperature not less than 60° C., and (ii) a dye receiver layer laminated on the intermediate layer such that the dye receiver layer is positioned at an external surface of said bag main body.

2. A photograph DP bag according to claim 1, wherein a perforated line portion is formed in the surface of said bag main body around said index print to split off one portion of said main body on which said index print is printed from another portion of said bag main body.

3. A photograph DP bag according to claim 1, further comprising a transparent or translucency order sheet overlapped on said index print and having a format to order re-printing based on said index print visible therethrough.

4. A photograph DP bag according to claim 1, wherein said index print includes a film identification code to identify the developed photograph film, which code number is the same as a film identification code attached on the developed photograph film.

5. A photograph DP bag comprising:
- a bag main body having a surface, for accommodating at least one of a printed photograph and a developed photograph film therein; and
- an index print sheet attached on the surface of said bag main body and having a receiver layer for sublimation-transcription at a surface thereof; and
- an index print of a positive image of the developed photograph film, which is printed on the receiver layer of said index print sheet by a sublimation-transcribing method,
- the receiver layer comprising (i) an intermediate layer laminated on a base material sheet of said index print sheet, the intermediate layer comprising a resin having a glass transition temperature not less than 60° C., and (ii) a dye receiver layer laminated on the intermediate layer such that the dye receiver layer is positioned at an external surface of said index print sheet.

6. A photograph DP bag according to claim 5, wherein a perforated line portion is formed in the surface of said index print sheet to split off one portion of said index print sheet on which said index print is printed from another portion of said index print sheet attached on said bag main body.

7. A photograph DP bag according to claim 5, further comprising a transparent or translucency order sheet overlapped on said index print and having a format to order re-printing based on said index print visible therethrough.

8. A photograph DP bag according to claim 5, wherein said index print includes a film identification code to identify the developed photograph film, which code number is the same as a film identification code attached on the developed photograph film.

9. A photograph DP bag comprising a bag main body for accommodating at least one of a printed photograph and a developed photograph film;
- said bag main body comprising a front sheet portion and a rear sheet portion opposed to each other and prescribing an internal space of said bag main body therebetween,
- at least one of said front sheet portion and said rear sheet portion comprising a receiver sheet for sublimation-transcription,
- the receiver sheet comprising (i) an intermediate layer laminated on said at least one of said front sheet portion and said rear sheet portion, the intermediate layer comprising a resin having a glass transition temperature not less than 60° C., and (ii) a dye receiver layer laminated on the intermediate layer such that the dye receiver layer is positioned at an external surface of said at least one of said front sheet portion and said rear sheet portion.

10. A photograph film bag comprising:
- a bag main body having a front sheet and a rear sheet, for inserting a developed photograph film therein, at least one of the front sheet and the rear sheet comprising a receiver sheet for sublimation-transcription; and
- an index print of a positive image of the developed photograph film which is printed on the receiver sheet of said at least one of the front sheet and the rear sheet by a sublimation-transcribing method,
- said receiver sheet comprising (i) an intermediate layer laminated on a base material sheet of said at least one of the front sheet and the rear sheet the intermediate layer comprising a resin having a glass transition temperature not less than 60° C., and (ii) a dye receiver layer laminated on the intermediate layer such that the dye receiver layer is positioned at an external surface of said at least one of the front sheet and the rear sheet.

11. A photograph film bag according to claim 10, further comprising a transparent or translucency order sheet overlapped on said index print and having a format to order re-printing based on said index print visible therethrough.

12. A photograph film bag according to claim 10, wherein said index print includes a film identification code to identify the developed photograph film, which code number is the same as a film identification code attached on the developed photograph film.

13. A photograph film bag comprising:
- a bag main body having an external surface and an end leave for inserting a developed photograph film therein; and
- a receiver layer for sublimation-transcription, formed on at least one of the external surface and the end leave of said bag main body,
- the receiver layer comprising (i) an intermediate layer laminated on said at least one of the external surface and the end leave, the intermediate layer comprising a resin having a glass transition temperature not less than 60° C., and (ii) a dye receiver layer laminated on the intermediate layer.

14. A photograph film bag according to claim 13 further comprising an index print of a positive image of the developed photograph film, which is printed on said receiver layer by a sublimation-transcribing method.

15. A photograph film bag according to claim 14, further comprising a transparent or translucency order sheet overlapped on said index print and having a format to order re-printing based on said index print visible therethrough.

16. A photograph film bag according to claim 14, wherein said index print includes a film identification code to identify the developed photograph film, which code number is the same as a film identification code attached on the developed photograph film.

17. An index print sheet, which is accommodated in a photograph film bag for accommodating a developed photograph film or a photograph DP bag for accommodating said photograph film bag and a printed photograph, comprising:
- a sheet main body having a surface;
- a receiver layer for sublimation-transcription formed on the surface of said sheet main body; and
- an index print of a positive image of the developed photograph film, which is printed on the receiver layer of said sheet main body by a sublimation-transcribing method,
- said index print including a film identification code to identify the developed photograph film, which code number is the same as a film identification code attached on the developed photograph film,
- said receiver layer comprising (i) an intermediate layer laminated on the surface of said sheet main body, the intermediate layer comprising a resin having a glass transition temperature not less than 60° C., and (ii) a dye receiver layer laminated on the intermediate layer.

18. An index print sheet according to claim 17, further comprising a transparent or translucency order sheet overlapped on said index print and having a format to order re-printing based on said index print visible therethrough.

* * * * *